US006737130B2

(12) United States Patent
Ferri

(10) Patent No.: US 6,737,130 B2
(45) Date of Patent: *May 18, 2004

(54) HERMETICALLY HEAT-SEALABLE, PRESSURE-RECLOSABLE PACKAGING ARTICLE CONTAINING SUBSTANTIALLY SPHERICAL HOMOGENEOUS POLYOLEFIN

(75) Inventor: Isabella Ferri, Bologna (IT)

(73) Assignee: Cryovac, Inc., Duncan, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/106,003

(22) Filed: Mar. 25, 2002

(65) Prior Publication Data

US 2003/0091763 A1 May 15, 2003

Related U.S. Application Data

(60) Provisional application No. 60/333,267, filed on Nov. 6, 2001.

(51) Int. Cl.$^7$ .............................. B32B 1/02; B32B 27/32
(52) U.S. Cl. ................... 428/35.2; 156/292; 156/308.4; 264/173.19; 428/35.7; 428/220; 428/516; 428/517; 428/906; 428/910
(58) Field of Search ................................ 428/516, 34.6, 428/34.7, 35.2, 35.7, 219, 220, 517, 906, 910; 156/290, 292, 308.4, 309.6; 264/173.19, 210.1, 173.15

(56) References Cited

U.S. PATENT DOCUMENTS 3,613,874 A    10/1971    Miller ........................ 206/46

(List continued on next page.)

FOREIGN PATENT DOCUMENTS

EP        0 801 096 A1        5/1997

(List continued on next page.)

OTHER PUBLICATIONS

"Branching Topography in Polyethylenes from a Chain Walking Catalyst", Cotts, DuPont CR&D, Abstract, Oct. 6, 2000.

(List continued on next page.)

*Primary Examiner*—D. S. Nakarani
(74) *Attorney, Agent, or Firm*—Rupert B. Hurley, Jr.

(57) ABSTRACT

A multilayer film has a hermetically heat-sealable, pressure-reclosable, outer heat seal layer which contains a blend of a substantially spherical homogeneous polyolefin (i.e., SSH polyolefin) with a different thermoplastic polymer. The SSH polyolefin is present in an amount of from about 20 to 80 weight percent, and the different thermoplastic polymer is present in the layer in an amount of from about 80 to 20 weight percent, based on total layer weight. The SSH polyolefin has at least 60 side chain branches per 1000 carbon atoms, and has a melt index of from about 1 to 10. The invention also includes a process for making the multilayer film. Also disclosed is a roll of film comprising a disposable outer layer which is directly and peelably adhered to a first surface of second layer comprising the SSH polyolefin, a packaging article comprising an inside layer comprising the SSH polyolefin. The invention also includes a process for making a sealed article in which the multilayer film is heat sealed to itself or another article by heating the seal layer to a temperature of at least 50° C. Finally, the invention includes a hermetically heat sealable, pressure reclosable multilayer film comprising a sealant layer comprising, at least 30% by weight of a single site catalyzed SSH polyolefin having a density of from about 0.85 to 0.89 g/cc, a melt index of 0.5 to 8 g/10 min, a Mw/Mn less than 3, and a short chain branching level of about 60 to 100 methyl groups per 1,000 carbon atoms, and an outer heat resistant layer comprising a thermoplastic polyolefin having DSC melting point or glass transition of at least about 100° C., the outer layer having a coefficient of friction of less than 0.5 as measured by ASTM D 1894.

26 Claims, 4 Drawing Sheets

U.S. PATENT DOCUMENTS

Figure 1:
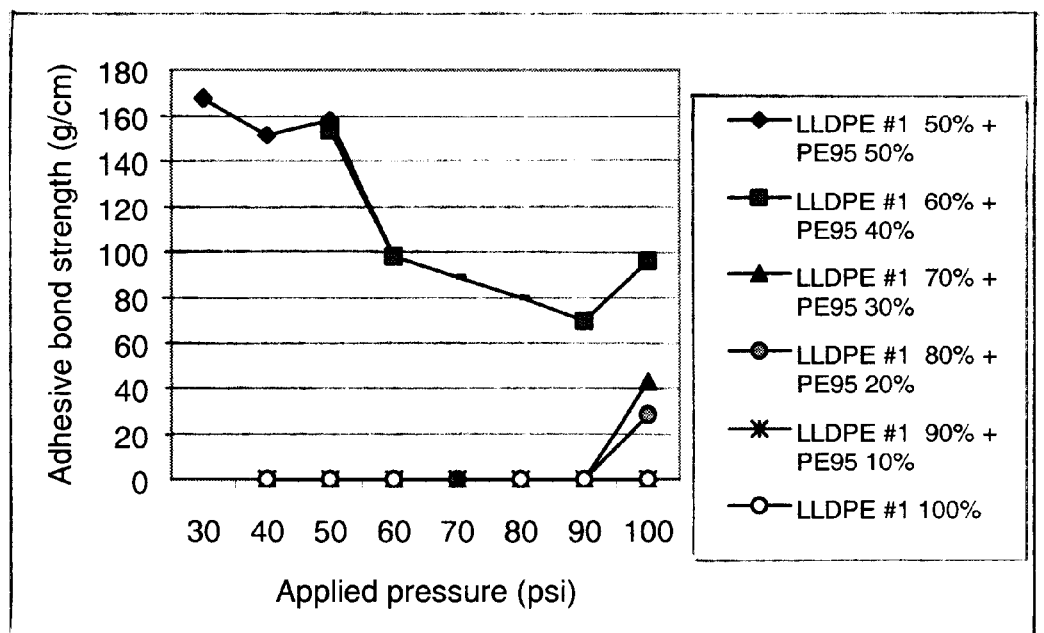

| | | |
|---|---|---|
| 4,064,296 A | 12/1977 | Bornstein et al. ............. 428/35 |
| 4,120,716 A | 10/1978 | Bonet ......................... 156/272 |
| 4,879,430 A | 11/1989 | Hoffman .................... 428/35.1 |
| 5,089,320 A | 2/1992 | Straus et al. ................ 428/216 |
| 5,206,075 A | 4/1993 | Hodgson, Jr. ............... 428/216 |
| 5,241,031 A | 8/1993 | Mehta ...................... 527/348.1 |
| 5,272,236 A | 12/1993 | Lai et al. .................. 526/348.5 |
| 5,278,272 A | 1/1994 | Lai et al. .................. 526/348.5 |
| 5,288,531 A | 2/1994 | Falla et al. ................ 428/35.2 |
| 5,397,613 A | 3/1995 | Georgelos ................. 428/36.7 |
| 5,447,772 A | 9/1995 | Flieger ........................ 428/99 |
| 5,486,051 A | 1/1996 | May .......................... 383/200 |
| 5,691,052 A | 11/1997 | Jones ......................... 428/355 |
| 5,852,145 A | 12/1998 | McLain et al. ............. 526/133 |
| 5,866,663 A | 2/1999 | Brookhart et al. .......... 526/170 |
| 5,880,241 A | 3/1999 | Brookhart et al. .......... 526/348 |
| 5,882,749 A | 3/1999 | Jones et al. ................ 428/35.2 |
| 5,882,789 A | 3/1999 | Jones et al. ................. 428/349 |
| 5,942,579 A | 8/1999 | Falla et al. ................. 525/240 |
| 5,944,425 A | 8/1999 | Forman ........................ 383/61 |
| 5,965,224 A | 10/1999 | Chen et al. ................ 428/35.2 |
| 5,993,962 A | 11/1999 | Timm et al. ................ 428/354 |
| 6,106,935 A | 8/2000 | Lambert et al. ............ 428/220 |
| 6,221,448 B1 | 4/2001 | Baetzold et al. ........... 428/35.2 |
| 6,248,442 B1 | 6/2001 | Kong et al. ................. 428/355 |
| 6,534,137 B1 | 3/2003 | Vadhar ...................... 428/34.9 |
| 2003/0072957 A1 | 4/2003 | Lee et al. ................... 428/515 |
| 2003/0091763 A1 | 5/2003 | Ferri ......................... 428/35.2 |

FOREIGN PATENT DOCUMENTS

| | | |
|---|---|---|
| EP | 0 884 331 A2 | 12/1998 |
| JP | 11092521 | 4/1999 |
| JP | 11106424 | 4/1999 |
| WO | 90/03414 | 4/1990 |
| WO | 92/14784 | 9/1992 |
| WO | 93/03093 | 2/1993 |
| WO | 96/23010 | 8/1996 |
| WO | 98/03559 | 1/1998 |
| WO | 98/30609 | 7/1998 |
| WO | 98/40420 | 9/1998 |
| WO | 98/42664 | 10/1998 |
| WO | 98/42665 | 10/1998 |
| WO | 98/47933 | 10/1998 |
| WO | 99/05189 | 2/1999 |
| WO | 99/15569 | 4/1999 |
| WO | 99/32226 | 7/1999 |
| WO | 99/46302 | 9/1999 |
| WO | 99/46303 | 9/1999 |
| WO | 99/46304 | 9/1999 |
| WO | 00/06620 | 2/2000 |
| WO | 00/10945 | 3/2000 |
| WO | 01/18097 A1 | 3/2001 |

OTHER PUBLICATIONS

1990 Annual Book of ASTM Standards, vol. 08.02, pp. 368–371, "Standard Test Method for Unrestrained Linear Thermal Shrinkage of Plastic Film and Sheeting".

"Linear Polymers with Hyperbranched Side Chains Via the "Hypergrafting" Strategy", Polymeric Materials: Science & Engineering 001, 84, 730–84, 731.

"Determination of Branching Distributions in Polyethlene and Ethylene Copolymers", Wild et al, pp. 441–455.

"New Pc(II)– and Ni(II)–Based Catalysts for Polymerization of Ethylene and a–Olefins", Johnson et al, J. Am, Chem., Soc. 1995, 117, 6414–6415.

"Copolymerization of Ethylene and Propylene with Functionalized Vinyl Monomers by Palladium(II) Catalysts", Johnson et al, J. Am. Chem. Soc. 1996, 118, 267–268.

"Mechanistic Studies of the Palladium–Catalyzed Copolymerization of Ethylene and a–Olefins with Methyl Acrylate", Mecking et al, J. Am. Chem, Soc. 1998, 120, 888–899.

Living Polymerization of a–Olefins Using $Ni^{ii}$, J. Am. Chem. Soc. 1996, 118, 11664–11665.

"Chain Walking: A New Strategy to Control Polymer Topology", Guan et al, Science, vol. 283, Mar. 26, 1999, pp. 2059–2062.

Macromolecules, American Chemical Society, 1999, vol. 32, No. 17, pp. 5471–5476.

Scaling Concepts in Polymer Physics, Pierre–Gilles de Gennes, Cornell University Press, 1979, pp. 19–21 and 219–241.

Viscoelastic Properties of Polymers, John D. Ferry, Third Edition, John Wiley & Sons, Inc., NY, NY, 1980, pp. 232–233 and 385–387.

"Polymer Interfaces", Structure and Strength, Richard P. Wool, Hanser Publishers, NY, 1995, pp. 1–20, 40–84, 85–90, 209–267 and 269–355.

HERMETICALLY HEAT-SEALABLE, PRESSURE-RECLOSABLE PACKAGING ARTICLE CONTAINING SUBSTANTIALLY SPHERICAL HOMOGENEOUS POLYOLEFIN

This application claims the benefit of provisional application No. 60/333,267, filed on Nov. 6, 2001.

FIELD OF THE INVENTION

The present invention pertains to packaging articles, particularly articles having a hermetic heat seal, as well as to reclosable packaging articles.

BACKGROUND OF THE INVENTION

Various means have been utilized to provide reclosable packaging which protects the contents against dehydration or leakage once the package is opened. Typical means have included interlocking closure strips, "zippers", fasteners, ties, and uncovered pressure-sensitive adhesive strips, positioned on a heat sealed package. These reclosure means all require additional steps in the manufacture of the package, in that the reclosing means must in some way be incorporated onto the package, e.g., adhered, tied around, or sealed to the other components as a means of becoming another component of the package. Other means have included a heat sealable multilayer film containing a layer other than the heat seal layer consisting of a polymer having enough "cold tack" to provide the property of self-adhesion or adhesion to other materials for the purpose of reclosing a package. However, such adhesive materials have been difficult to process due to the presence of low molecular weight tackifing agents and/or have had organoleptic problems and food law problems associated therewith. It would be desirable to provide a coextruded multilayer film, comprising a single film layer capable of forming a hermetic heat seals while at the same time having reclosable properties without the additional processing steps associated with attaching a separate closure device, and without the organoleptic problems of prior art approaches.

SUMMARY OF THE INVENTION

It has been discovered that a particular new type of highly branched polyolefin, herein referred to as a "substantially spherical homogeneous polyolefin", has the ability to provide a film seal layer with the dual properties of being hermetically heat sealable and pressure-reclosable, thereby making it unnecessary to affix a separate re-closure device such as a zipper or other closure device. The hermetic seal is fused so that it is impervious to air and liquid, such as water. The SSH polyolefin may be coextruded in the seal layer in the production of a monolayer or multilayer film. The substantially spherical polyolefin does not require the addition of low molecular weight tackifier to accomplish the dual function, and therefore does not exhibit many of the processing and organoleptic problems associated with high cold tack polymer formulations of the prior art.

As a first aspect, the present invention is directed to a multilayer film comprising a hermetically heat-sealable, pressure-reclosable, outer heat seal layer which comprises a blend of a substantially spherical homogeneous polyolefin with a different thermoplastic polymer. Preferably, the outer heat seal layer and one other layer of the multiplayer film are coextruded. Preferably, all layers of the multiplayer film are coextruded. The substantially spherical polyolefin is present in an amount of from about 20 to 80 weight percent, based on total weight of the heat seal layer. The different thermoplastic polymer is present in the layer in an amount of from about 80 to 20 weight percent, based on total layer weight. The substantially spherical polyolefin has at least 60 side chain branches per 1000 carbon atoms, and contains for every 100 branches that are methyl, 1 to about 80 ethyl branches, 1 to about 20 propyl branches, 1 to about 50 butyl branches, 1 to about 20 amyl branches, and 1 to about 100 hexyl or longer branches. The substantially spherical homogeneous polyolefin has a melt index of from about 1 to 10.

More preferably, the substantially spherical homogeneous polyolefin has from about 65 to about 140 branches per 1000 methylene groups, and for every 100 branches that are methyl, about 1 to about 20 ethyl branches, 1 to about 10 propyl branches, 1 to about 15 butyl branches, 1 to about 10 amyl branches, and 1 to about 35 hexyl or longer branches. More preferably, the substantially spherical homogeneous polyolefin has at least 70 branches per 1000 carbon atoms. More preferably, the substantially spherical homogeneous polyolefin has from about 80 to about 125 branches per 1000 methylene groups, and contains for every 100 branches that are methyl, about 2 to about 18 ethyl branches, about 2 to about 8 propyl branches, about 2 to about 12 butyl branches, about 2 to about 8 amyl branches, and about 8 to about 30 hexyl or longer branches. More preferably, the substantially spherical homogeneous polyolefin has from about 85 to about 120 branches per 1000 methylene groups. More preferably, the substantially spherical homogeneous polyolefin has from about 75 to about 85 branches per 1000 methylene groups.

Preferably, the substantially spherical homogeneous polyolefin has a density of from about 0.85 to 0.88 g/cm$^3$. Preferably, the substantially spherical homogeneous polyolefin is present in the outer layer in an amount of at least 30 to 70 weight percent.

Preferably, the substantially spherical homogeneous polyolefin is a homopolymer derived from ethylene. Preferably, the substantially spherical homogeneous polyolefin is a copolymer comprising mer units derived from ethylene and one or more members selected from the group consisting of propylene, butene, hexene, and octene.

Preferably, the different polymer comprises at least one member selected from the group consisting of polyolefin homopolymer, ethylene/alpha-olefin copolymer, polyamide, polyester, ethylene/vinyl alcohol copolymer, halogenated polymer, polystyrene, polynorbornene, ethylene/ester copolymer, and ethylene/unsaturated acid polymer.

Optionally, the film is heat-shrinkable.

Preferably, the film has a thickness of from about 0.3 to 25 mils.

Preferably, the film is capable of exhibiting a strength of a 40 psi pressure-induced bond of at least 100 grams per centimeter for at least 2 repetitions.

Preferably, the multilayer film is produced using a coextrusion process. Alternatively, the film is produced using a lamination process.

In one preferred embodiment, the multilayer film further comprises an oxygen barrier layer.

As a second aspect, the invention is directed to a process for making a multilayer film. The process comprises (A) coextruding a first layer and a second layer, wherein the first layer is an outer film layer in accordance with the heat seal layer according to the first aspect of the present invention, and (B) orienting the extrudate so that an oriented film is formed.

As a third aspect, the invention is directed to a roll of film comprising a disposable outer layer which is directly and peelably adhered to a first surface of second layer which is compositionally in accordance with the seal layer according to the first aspect of the present invention. The second layer is hermetically heat-sealable, and pressure-reclosable, and a second surface of the second layer is directly adhered to a thermoplastic third layer.

As a fourth aspect, the present invention is directed to a packaging article comprising an inside layer in accordance with the seal layer according to the first aspect of the present invention. The inside layer is heat sealed to itself or another component of the article, with the inside layer being hermetically heat-sealable and pressure-reclosable to itself or the other component. Preferably, the packaging article is a bag and the inside layer is hermetically heat sealed to itself. Preferably, the multilayer film is heat sealed to a second component which is molded or thermoformed.

As a fifth aspect, the present invention is directed to a process for making a sealed article, comprising: (A) providing a film having a seal layer in accordance with the first aspect of the present invention, and (B) heat sealing the film to itself or another article by heating the seal layer to a temperature of at least 50° C.

As a sixth aspect, the present invention is directed to a hermetically heat sealable, pressure-reclosable multilayer film comprising: (A) a sealant layer comprising, at least 30% by weight of a single site catalyzed substantially spherical polyolefin, the substantially spherical polyolefin having a density of from about 0.85 to 0.89 g/cc, a melt index of 0.5 to 8 g/10 min, a $M_w/M_n$ less than 3, and a short chain branching level of about 60 to 100 methyl groups per 1,000 carbon atoms; and, (B) an outer heat resistant layer comprising a thermoplastic polyolefin having DSC melting point or glass transition of at least about 100° C., the outer layer having a coefficient of friction of less than 0.5 as measured by ASTM D 1894. Preferably, the sealant layer comprises a substantially spherical polyolefin having a melt index of 1.5 to 7. Preferably, the sealant layer comprises a substantially spherical polyolefin having a weight average molecular weight ($M_w$) of from 90,000 to 150,000.

DETAILED DESCRIPTION OF THE INVENTION

As used herein, the phrase "substantially spherical homogeneous polyolefin" (i.e., "SSH polyolefin") refers to single site catalyzed resin with a polymer architecture wherein there are at least 60 side branches from the main chain for every 1000 main chain carbons. While not wishing to be restricted to any single sub-architecture, it is possible that some of the side branches may themselves contain side branches, similar to dendritic, or "tree-like" structures. It is believed from observations of the performance of these highly branched homogeneous polymers, that the number and type of branching results in a macro-structure which assumes a somewhat spherical conformation. This substantially spherical topology of the polymer chain is believed to be responsible for unique flow properties, as a consequence of interaction with other polymer chains.

The SSH polymer useful in the present invention have greater than 50 side chain branches per 1000 carbon atoms, preferably at least 60 side chain branches per 1000 carbon atoms; preferably from about 65 to 140 side chain branches per 1000 carbon atoms, more preferably from about 75 to 125 side chain branches per 1000 carbon atoms, or from about 85 to about 120 side chain branches per 1000 carbon atoms, such as 75 to 85 side chain branches per 1000 carbon atoms. For every 100 side chain branches that are methyl, the SSH polymer has 1 to about 80 ethyl branches, 1 to about 20 propyl branches, 1 to about 50 butyl branches, 1 to about 20 amyl branches, and 1 to about 100 hexyl or longer branches.

More preferably, the SSH polyolefins useful in the present invention have from about 60 to 110 side chain branches per 1000 carbon atoms. For every methyl 100 side chain branches, preferably there are from 1 to about 20 ethyl branches, from 1 to about 10 propyl branches, from 1 to about 15 butyl branches, from 1 to about 10 amyl branches, and from 1 to about 30 hexyl or longer branches.

More preferably, the SSH polymer useful in the present invention have from about 70 to 100 side chain branches per 1000 carbon atoms. For every 100 branches that are methyl, preferably there are from about 2 to about 18 ethyl branches, from about 2 to about 8 propyl branches, from about 2 to about 12 butyl branches, from 2 to about 8 amyl branches, and from about 8 to about 30 hexyl or longer branches.

The SSH polymer is preferably a narrow molecular weight (Mw/Mn), single site catalyzed resins. The SSH polymer preferably has a molecular weight distribution less than 3, preferably less than 2.5. However, it is possible to prepare SSH polymer having greater Mw/Mn using tandem reactor processes which can result in bimodal or multimodal products comprising the SSH polyolefins.

The SSH polymer exhibits a melt index of from about 0.5 to about 10 g/10 min, preferably from about 1 to 9, more preferably from about 1.1 to 8.5, more preferably from about 1.5 to about 7.5. The SSH polyethylene useful in the present invention has a molecular weight (Mw) of from about 80,000 to about 200,000, preferably from about 90,000 to about 150,000. The SSH polymer may be prepared by methods of synthesis disclosed herein, preferably using nickel (II) α-diimine catalyst complexes. Other methods of preparing SSH polyolefin include methods disclosed in U.S. Pat. No. 5,866,663 to Brookhart et al. entitled "Process of Polymerizing Olefins", hereby incorporated in its entirety, by reference thereto.

The SSH polymer useful in the present invention can alternatively be evaluated via proton NMR or $^{13}C$ NMR. SSH polyolefin has at least 50 branches per 1000 carbon atoms, preferably at least 60 branches per 1000 carbon atoms, in which at least 50 percent of the branches are methyl, from 2 to about 25 percent of the branches are ethyl, from 1 to about 20 percent of the branches are propyl, and from 1 to about 20 percent of the branches are butyl, and from 1 to about 20 percent of the branches are amyl, and from about 5 to about 50 percent of the branches are hexyl or longer. Preferably, the SSH polymer has at least 60 branches per 1000 carbon atoms, in which at least 60 to about 80 percent of the branches are methyl, from about 4 to about 20 percent of the branches are ethyl, from about 2 to about 15 percent of the branches are propyl, and from about 2 to about 20 percent of the branches are butyl, and from about 2 to about 15 percent of the branches are amyl, and from about 5 to about 30 percent of the branches are hexyl or longer.

More preferably, the SSH polyolefin has at least 70 branches per 1000 carbon atoms, in which at least 70 percent of the branches are methyl, from about 2 to about 10 percent of the branches are ethyl, from about 2 to about 10 percent of the branches are propyl, and from about 2 to about 10 percent of the branches are butyl, and from about 2 to about 10 percent of the branches are amyl, and from about 7 to about 20 percent of the branches are hexyl or longer.

Preferably, the SSH polymer in the film of the invention is a SSH polyolefin, preferably a SSH polyethylene. In one preferred embodiment, at least one outer layer of the film contains one or more SSH polyethylene, which may make up 100 percent of the weight of the film layer. Alternatively, the SSH polymer is blended with one or more additional polymers and/or additives (such a slip agents, antiblock agents, etc). If another polymer is present, the SSH polymer preferably comprises at least 20% of the weight of the layer. Preferably, the SSH polyolefin comprises about 30% by weight of the blend. More preferably, the SSH polyolefin comprises about 40% by weight of the blend. Preferred ranges for resin blends comprising the SSH polyolefin are in the range of from about 10 percent to about 90 percent, preferably about 20 to about 80 percent, preferably from about 30 percent to about 75 percent, still more preferably from about 40 to 70 percent of the SSH polyolefin. The optimal amount of SSH polyolefin in the layer depends upon the degree of branching present in the SSH polymer or polymers, as well as on the nature of any other polymeric component and/or additive in the layer. Otherwise, the pressure-reclosability of the heat seal layer may be inadequate, or the heat seal quality of the multilayer film may be diminished.

It has been found that in addition to being able to form a pressure-sensitive adhesive bond with itself, the SSH polyolefin utilized in the films of the present invention is also capable of forming a hermetic heat seal with other polymers, such as, for example, linear low density polyethylene (LLDPE), very low density polyethylene (VLDPE), ethylene/vinyl acetate copolymer (EVA), ionomer, and to a lesser extent, nylon, polystyrene, and polyethylene terephthalate.

A preferred multilayer film of the present invention has an outer, hermetic heat seal layer containing a SSH polyethylene which imparts adhesive character to the layer. At least one preferred embodiment of the invention has been found to be capable of adhering to itself repeatedly through many cycles of cold pressure bonding followed by pulling apart, with the adhesive character maintaining an adhesive bond sufficient to afford a pressure-reclosable feature to the packaging. The pressure-reclosability is capable of providing from 2 to 250 pressure-reclose cycles; typically from 4 to 100 cycles, and still more typically from 4 to 25 pressure-reclose cycles.

As used herein, the phrase "pressure-reclosable" refers to material that develops an adhesive bond to itself or to other surfaces at room temperature, by applying only a moderate pressure (e.g., 0.5–20 psi). Such as bond is also referred to herein as a pressure-induced bond. Such behavior is sometimes referred to as forming cold seals. The presence of substantially spherical homogeneous polymer in the outer heat seal layer of the multilayer film renders the film capable of serving as a pressure-reclosable layer. The film is capable of adhesion to an adherend using light pressure, following which the adhesive bond can be broken without leaving substantial residue on the adherend. The SSH polymer used in the outer layer of the film is capable of serving as an cold seal adhesive over a broad temperature range, e.g., from about −20° C. to about 50° C. However, the SSH polymer is preferably used as a pressure responsive adhesive at room temperature, i.e., at 20° C. to 30° C., or below, e.g., down to refrigeration temperatures, such as 1° C., and even down through frozen temperatures, i.e., through −10° C. to −20° C. Moreover, this adhesive nature is enhanced when the SSH polymer is present in a blend with a semi-crystalline thermoplastic polymer, preferably another polyolefin.

As used herein, the term "film" is used in a generic sense to include plastic web, regardless of whether it is film or sheet, and whether it has been reshaped to a geometry which is no longer planar. Preferably, films of and used in the present invention have a thickness of 0.25 mm or less.

As used herein, the term "package" refers to packaging materials configured around (i.e., enveloping) a product being packaged. The phrase "packaged product," as used herein, refers to the combination of a product which is surrounded by a packaging material.

As used herein, the phrases "inner layer" and "internal layer" refer to any layer, of a multilayer film, having both of its principal surfaces directly adhered to another layer of the multilayer film.

As used herein, the phrase "outer layer" refers to any film layer of film having less than two of its principal surfaces directly adhered to another layer of the film. The phrase is inclusive of monolayer and multilayer films. In multilayer films, there are two outer layers, each of which has a principal surface adhered to only one other layer of the multilayer film. In monolayer films, there is only one layer, which, of course, is an outer layer in that neither of its two principal surfaces are adhered to another layer of the film.

As used herein, the phrase "inside layer" refers to the outer layer of a multilayer packaging film, which is closest to the product cavity, relative to the other layers of the multilayer film.

As used herein, the phrase "outside layer" refers to the outer layer, of a multilayer packaging film, which is furthest from the product cavity relative to the other layers of the multilayer film. Moreover, an outside layer has an "inside surface" and an "outside surface," the inside surface being that surface of the outside layer which is adhered to another film layer, and the outside surface of the outside layer being that surface which is not adhered to another film layer.

As used herein, the phrase "directly adhered", as applied to film layers, is defined as adhesion of the subject film layer to the object film layer, without a tie layer, adhesive, or other layer there between. In contrast, as used herein, the word "between", as applied to a film layer expressed as being between two other specified layers, includes both direct adherence of the subject layer between to the two other layers it is between, as well as including a lack of direct adherence to either or both of the two other layers the subject layer is between, i.e., one or more additional layers can be imposed between the subject layer and one or more of the layers the subject layer is between.

As used herein, the phrases "heat-shrinkable," "heat-shrink" and the like refer to the tendency of a film, generally an oriented film, to shrink upon the application of heat, i.e., to contract upon being heated, such that the size (area) of the film decreases while the film is in an unrestrained state. Likewise, the tension of a heat-shrinkable film increases upon the application of heat if the film is restrained from shrinking. As a corollary, the phrase "heat-contracted" refers to a heat-shrinkable film, or a portion thereof, which has been exposed to heat such that the film or portion thereof is in a heat-shrunken state, i.e., reduced in size (unrestrained) or under increased tension (restrained).

As used herein, the phrase "free shrink" refers to the percent dimensional change in a 10 cm×10 cm specimen of film, when shrunk at 185° F., with the quantitative determination being carried out according to ASTM D 2732, as set forth in the 1990 *Annual Book of ASTM Standards*, Vol. 08.02, pp. 368–371, which is hereby incorporated, in its entirety, by reference thereto. Preferably, the heat shrinkable film has a total free shrink (i.e., machine direction plus transverse direction), as measured by ASTM D 2732, of at least as 10 percent at 185° C., more preferably at least 17 percent, still more preferably, at least 20 percent, and, yet still more preferably, at least 30 percent, 40 percent, 50 percent, 60 percent, 70 percent, 80 percent, 90 percent, 100 percent, and even at least 110 or 120 percent total free shrink at 185° F.

As used herein, the phrase "machine direction", herein abbreviated "MD", refers to a direction "along the length" of the film, i.e., in the direction of the film as the film is formed during extrusion and/or coating. As used herein, the phrase "transverse direction", herein abbreviated "TD", refers to a direction across the film, perpendicular to the machine or longitudinal direction.

As used herein, the term "seal" refers to any seal of a first region of an outer film surface to a second region of an outer film surface, including heat seals as well as adhesive bonded cold seals made at a temperature of −20° C. to 49° C. The term "heat seal" refers to seals made by heating one or more polymeric components in one or more films to at least 50° C., so long as the temperature is at or above the heat seal initiation temperature of the blend in the seal layer, in order to form a hermetic seal. Heat sealing can be performed by any one or more of a wide variety of manners, such as using a heat seal technique (e.g., melt-bead sealing, thermal sealing, impulse sealing, ultrasonic sealing, hot air, hot wire, infrared radiation, etc.). A preferred sealing method is impulse heat sealing, utilizing seal wire of a material known as Toss Alloy 20, obtained from Toss Machine Components of Nazareth, Pa. In making the heat seal, the total dwell time is typically about 2 seconds; however, shorter seal times are possible.

As used herein, the term "hermetic seal" refers to both peelable and unpeelable seals which do not permit the passage of fluid, especially a gas such as air, and liquid such as water.

As used herein, the phrases "seal layer," "sealing layer," "heat seal layer," and "sealant layer," refer to an outer film layer, or layers, involved in the heat sealing of the film to itself, another film layer of the same or another film, and/or another article which is not a film. It should also be recognized that in general, up to the outer three mils of a film can be involved in the sealing of the film to itself or another layer. With respect to packages having only fin-type seals, as opposed to lap-type seals, the phrase "sealant layer" generally refers to the inside film layer of a package, as well as supporting layers within 3 mils of the inside surface of the sealant layer, the inside layer frequently also serving as a food contact layer in the packaging of foods.

As used herein, the term "bag" is inclusive of L-seal bags, side-seal bags, end-seal bags, backseamed bags, and pouches. An L-seal bag has an open top, a bottom seal, a seal along a first side edge, and a seamless (i.e., folded, unsealed) second side edge. A side-seal bag has an open top and a seamless bottom edge, with each of its two side edges having a seal therealong. An end-seal bag is made from seamless tubing and has an open top, a bottom seal, and seamless side edges. A pouch has an open top and a bottom seal and a seal along each side edge. Although seals along the side and/or bottom edges can be at the very edge itself, (i.e., seals of a type commonly referred to as "trim seals"), preferably the seals are spaced inward (preferably ¼ to ½ inch, more or less) from the bag side edges, and preferably are made using impulse-type heat sealing apparatus, which utilizes a bar which is quickly heated and then quickly cooled. A backseamed bag is a bag having an open top, a "backseam" seal running the length of the bag in which the bag film is either fin-sealed or lap-sealed, two seamless side edges, and a bottom seal along a bottom edge of the bag.

As used herein, the term "vacuum skin packaging" refers to a topographic heat seal, as contrasted to a perimeter heat seals. In forming a topographic seal, at least one film is heated and then brought in to contact with another film surface using differential air pressure. The films contour about a product and hermetically bond to one another throughout the region(s) of film-to-film contact. SSH polyolefin, especially SSH polyethylene, is especially well-suited to the topographic seals employed in vacuum skin packaging. Vacuum skin packaging is described in U.S. Pat. No. RE 030009, to Purdue, et al., which is hereby incorporated, in its entirety, by reference thereto.

As used herein, the phrase "heterogeneous polymer" refers to polymerization reaction products of relatively wide variation in molecular weight ($M_w/M_n$ greater than 3.0) and relatively wide variation in composition distribution, i.e., typical polymers prepared, for example, using conventional Ziegler-Natta catalysts. Heterogeneous copolymers typically contain a relatively wide variety of main chain lengths and comonomer percentages.

As used herein, the phrase "homogeneous polymer" refers to polymerization reaction products of relatively narrow molecular weight distribution ($M_w/M_n$ less than 3.0) and relatively narrow composition distribution. Homogeneous polymers are useful in various layers of the multilayer film used in the present invention. Homogeneous polymers are structurally different from heterogeneous polymers, in that homogeneous polymers exhibit a relatively even sequencing of comonomers within a chain, a mirroring of sequence distribution in all chains, and a similarity of length of all chains, i.e., a narrower molecular weight distribution. Furthermore, homogeneous polymers are typically prepared using metallocene or other single-site catalysts, rather than, for example, Ziegler Natta catalysts.

More particularly, homogeneous ethylene homopolymers or ethylene/alpha-olefin copolymers may be characterized by one or more processes known to those of skill in the art, such as molecular weight distribution ($M_w/M_n$, $M_z/M_n$), composition distribution breadth index (CDBI), and narrow melting point range and single melting point behavior. The molecular weight distribution (Mw/Mn), also known as polydispersity, or polydispersity index ("PDI") may be determined by gel permeation chromatography.

The homogeneous polyolefin useful in the films of this invention generally has ($M_w/M_n$) of less than 3; preferably less than 2.7, preferably from about 1.9 to 2.5; more preferably, from about 1.9 to 2.3. The composition distribution breadth index (CDBI) of homogeneous ethylene/alpha-olefin copolymers will generally be greater than about 70 percent. The CDBI is defined as the weight percent of the copolymer molecules having a comonomer content within 50 percent (i.e., plus or minus 50%) of the median total molar comonomer content. The CDBI of linear polyethylene, which does not contain a comonomer, is defined to be 100%. The Composition Distribution Breadth Index (CDBI) is determined via the technique of Temperature Rising Elution Fractionation (TREF). CDBI distinguishes the homogeneous copolymers (narrow composition distribution as assessed by CDBI values generally above 70%) from heterogeneous copolymers such as VLDPEs which generally have a broad composition distribution as assessed by CDBI values generally less than 55%. The CDBI of a copolymer is readily calculated from data obtained from techniques known in the art, such as, for example, temperature rising elution fractionation as described, for example, in Wild et. al., J. Poly. Sci. Poly. Phys. Ed., Vol. 20, p.441 (1982). Preferably, homogeneous ethylene/alpha-olefin copolymers have a CDBI greater than about 70%, i.e., a CDBI of from about 70% to 99%.

Homogeneous ethylene/alpha-olefin copolymer can, in general, be prepared by the copolymerization of ethylene and any one or more alpha-olefin. Preferably, the alpha-olefin is a $C_3$–$C_{20}$ alpha-monoolefin, more preferably, a $C_4$–$C_{12}$ alpha-monoolefin, still more preferably, a $C_4$–$C_8$ alpha-monoolefin. Still more preferably, the alpha-olefin comprises at least one member selected from the group consisting of butene-1, hexene-1, and octene-1, i.e., 1-butene, 1-hexene, and 1-octene, respectively. Preferably, the alpha-olefin comprises octene-1, and/or a blend of hexene-1 and butene-1.

Processes for preparing and using linear homogeneous polyolefins are disclosed in U.S. Pat. No. 5,206,075, U.S. Pat. No. 5,241,031, and PCT International Application WO 93/03093, each of which is hereby incorporated by reference thereto, in its entirety. Further details regarding the production and use of linear homogeneous ethylene/alpha-olefin copolymers are disclosed in PCT International Publication Number WO 90/03414, and PCT International Publication Number WO 93/03093, both of which designate Exxon Chemical Patents, Inc. as the Applicant, and both of which are hereby incorporated by reference thereto, in their respective entireties.

Still another genus of homogeneous polyolefins is disclosed in U.S. Pat. No. 5,272,236, to LAI, et. al., and U.S. Pat. No. 5,278,272, to LAI, et. al., both of which are hereby incorporated by reference thereto, in their respective entireties. Each of these patents disclose "substantially linear" homogeneous long chain branched ethylene/alpha-olefin copolymers produced and marketed by The Dow Chemical Company.

Still another genus of homogeneous polyolefins is homogeneous hyperbranched polyolefins, which is inclusive of SSH polyolefin. Hyperbranched homogeneous polyethylene, while resembling other homogeneous resins in aspects such as low polydispersity index ($M_w/M_n$ of less than 3.0, preferably less than 2.7, preferably having a $M_w/M_n$ of from about 1.9 to 2.5), do not resemble commercial linear homogenous ethylene/alpha-olefin copolymer, or long chain branched homogeneous ethylene/alpha-olefin copolymer, at least in that the hyperbranched homogeneous polyethylenes may be characterized as having a mixed population of side chains of different chain length, together with a high side chain branching level. Additionally, it is possible that at least some of the short chain side branches of the hyperbranched homogeneous polyethylene are themselves short chain branched. While the molecular weight is similar from one polymer chain to the next, the different side branch length and/or structure affects the crystallinity in a different manner than commercial homogeneous resins such as Mitsui TAFMER® polymer or Dow ENGAGE® polymer. While commercial homogeneous resins contain side branch levels at levels of, for example 48 side chains per 1000 carbon atoms, those side chains are typically of the same length owing to the method of manufacture using ethylene and an alpha-olefin such as butene or octene. In contrast, the hyperbranched homogeneous polyethylene resin is preferably produced using only one monomer (preferably ethylene) and generates the side branch population in situ.

SSH polyolefin, a species of homogeneous hyperbranched polyolefin, includes the SSH polyethylene which is a preferred component in the article of the present invention. SSH polyolefin is structurally different from linear homogeneous polyolefin, such as EXACT® linear homogeneous ethylene/alpha-olefin copolymer supplied by Exxon, or long chain branched homogeneous polyolefin resin known as AFFINITY® ethylene/alpha-olefin copolymer supplied by The Dow Chemical Company. SSH polyolefin resins, while resembling other homogeneous resins in aspects such as low polydispersity index ($M_w/M_n$ of less than 3.0, preferably less than 2.7, preferably having a $M_w/M_n$ of from about 1.9 to 2.5) and single melting point, do not resemble the linear homogeneous resins such as EXACT® or TAFMER® resins as a consequence of side chain branching level greater than 60 branches, in addition to the unique population and mixed type and length of the side branch chains. Likewise, SSH polyolefin are not the same as substantially linear long chain branched resins such as Dow AFFINITY® ethylene/alpha-olefin copolymer or DuPont Dow ENGAGE® copolymer as a consequence of very high side chain branching level (greater than 60) in addition to the unique population, mixed type and length of the side branch chains. Additionally, it is possible that at least some of the short chain, side branches of the hyperbranched homogeneous polyethylene are themselves short chain branched, thereby producing a forked microstructure. Thus, SSH polyethylene is believed to exhibit a topology, or chain macrostructure, very different from the chain superstructure of commercially available (linear or substantially linear) homogeneous resins, yet preserve the narrow molecular weight distribution characterizing a homogeneous resin. While related to hyperbranched homogeneous polyolefins, discussed above, SSH polyolefin may be distinguished from the hyperbranched homogeneous polyolefin by the very high short chain branch levels (>50 short chain branches per 1000 carbons). The chain architecture and microstructure of SSH polyethylene results in a macrostructure which is believed to depart from a linear profile. In other words, whereas linear homogeneous polyolefin resins possess a rod-like chain architecture, and whereas the substantially linear long chain branched homogeneous polyolefin resins possess a "T", or three-arm star architecture, SSH polyolefin is believed to possess a chain structure approaching spherical. Whereas linear homogeneous or substantially linear homogeneous polyethylenes exhibit a steady increase in viscosity with increasing molecular weight, at least some of the SSH polyolefins, such as SSH polyethylene (especially SSH polyethylene having short chain branching level greater than 60 side branches per 1000 carbon atoms) do not show increasing viscosity at higher molecular weights. That is, the viscosity of some SSH polyethylene decreases as the branch content of the SSH polyethylene increases, as is apparent from higher melt index values. An increase in melt index with side branch level, for example in SSH polyethylene having a molecular weight above 100,000, is surprising and another indication of a tendency toward spherical macrostructure for very highly branched homogeneous polyolefins.

Because SSH polyolefin resin is a homogeneous resin, each substantially spherical polymer chain is like the next. The molecular structure of the SSH polyolefin is to be contrasted with free-radical polymerized polyolefin resins such as conventional low or medium density polyethylenes. Low density polyethylene (LDPE) contains polymer chains which differ greatly with respect to molecular weight, as is apparent from the fact that LDPE exhibits a $M_w/M_n$ greater than 3.

SSH polyethylene (SSHPE) have a solid state density (at 25° C.) less than 0.91 grams/cc, preferably less than 0.90, more preferably less than 0.89 grams/$cm^3$; such as a density ranging from about 0.85 g/$cm^3$ to about 0.90 g/$cm^3$, more preferably having a density ranging from 0.855 g/$cm^3$ to 0.870 g/$cm^3$. While these density ranges are preferred and reflective of the nature of these highly branched polymers, it is possible to practice this invention using SSHPE's having densities above 0.91 g/$cm^3$. Such higher density SSH resins may be formed using tandem reactors or mixed single-site catalysts so as to produce polymer chains having the spherical polyolefin appended to an otherwise linear chain, resulting in a stick and ball macrostructure, or positioned within an otherwise linear chain. Such structures are contemplated to exhibit densities higher than 0.91 g/cm$^3$.

As used herein, the phrase "ethylene/alpha-olefin copolymer" refers to both heterogeneous copolymers such as linear low density polyethylene (LLDPE), very low and ultra low density polyethylene (VLDPE and ULDPE), as well as homogeneous copolymers such as linear metallocene catalyzed polymers such as EXACT® resins obtainable from the Exxon Chemical Company, and TAFMER® resins obtainable from the Mitsui Petrochemical Corporation. Ethylene/alpha-olefin copolymers include copolymers of ethylene with one or more comonomers selected from $C_4$ to $C_{10}$ alpha-olefin such as butene-1, hexene-1, octene-1, etc. in which the molecules of the copolymers comprise long chains with relatively few side chain branches or cross-linked structures. The term "alpha-olefin" does not include vinyl aromatic monomers such as styrene. Other ethylene/alpha-olefin copolymers, such as the long chain branched homogeneous ethylene/alpha-olefin copolymers available from the Dow Chemical Company, known as AFFINITY® resins, are also included as ethylene/alpha-olefin copolymers useful for incorporation into certain film layers of the present invention.

Although the film of the present invention can be a monolayer film laminated or extrusion-coated to at least one other film layer to form a multilayer film, in one preferred embodiment the multilayer film is a coextruded film having SSH polyethylene present in one or more of the outer layers of the film. Alternatively, the SSH polyethylene can be present in an inner film layer or the outer heat seal layer to provide a package having an easy-open feature where the film readily delaminates upon the application of stress, but may be re-closed using pressure.

Preferably, the film according to the present invention comprises a total of from 2 to 20 layers; more preferably, from 2 to 12 layers; more preferably, from 2 to 9 layers; more preferably, from 3 to 8 layers. Various combinations of layers can be used in the formation of a multilayer film according to the present invention. Given below are some examples of preferred multilayer film structures in which letters are used to represent film layers (although only 2- through 5-layer embodiments are provided here for illustrative purposes, further layers could be present):

A/B,
A/C,
A/B/A,
A/B/B',
A/B/C,
A/B/C/B,
A/B/C/B',
A/B/C/B/A,
B/A/B',
B/A/C/B
B/A/C/B/A' wherein
A represents a layer that includes the SSH polyethylene described above, in a blend with another polymer, particularly an ethylene/alpha-olefin copolymer;
B represents a layer including at least one member selected from the group consisting of polyolefin (particularly an ethylene/alpha-olefin copolymer), polyester (including polycarbonate), polyamide, polyaromatic (particularly polystyrene), poly(phenol-formaldehyde), and poly(amine-formaldehyde)), polyether, polyimide, polyimine, polyurethane, polysulfone, polyalkyne and ionomer; and
C represents a layer including a polymer serving as an oxygen barrier layer, e.g., polyvinylidene chloride "PVDC" (PVDC homopolymer and/or methyl acrylate copolymer "PVDC-MA" and/or vinyl chloride copolymer "PVDC-VC"), ethylene/vinyl alcohol copolymer ("EVOH"), polyamide, etc.

As required, one or more tie layers can be used between any one or more layers of in any of the above multilayer film structures. Also, while "A" is a SSH polyethylene in the above structures, "A'" is a different substantially spherical polyethylene, and so on, whereas a film having two "B" layers (as opposed to B and B') could have the same B polymer(s) or different B polymer(s), in the same or different amounts and/or ratios with respect to one another and with respect to the multilayer film as a whole.

In general, the multilayer film(s) used in the present invention can have any total thickness desired, so long as the film provides the desired properties for the particular packaging operation in which the film is used, e.g. abuse-resistance (especially puncture-resistance), modulus, seal strength, optics, etc. Preferably, the film has a total thickness of less than about 20 mils, more preferably the film has a total thickness of from about 2 to 20 mils, still more preferably from about 2 to 10 mils, and yet still more preferably, from about 1 to 6 mils.

As used herein, the phrase "packaging article" is used with reference to bags, pouches, casings, trays, etc., which are useful for enclosing products.

As used herein, the term "barrier", and the phrase "barrier layer", as applied to films and/or film layers, are used with reference to the ability of a film or film layer to serve as a barrier to the passage of one or more gases. In the packaging art, selective oxygen (i.e., gaseous $O_2$) barrier layers have included, for example, hydrolyzed ethylene/vinyl acetate copolymer (designated by the abbreviations "EVOH" and "HEVA", and also referred to as "ethylene/vinyl alcohol copolymer"), polyvinylidene chloride ("PVDC"), especially PVDC-methyl acrylate copolymer ("PVDC-MA"), and PVDC-vinyl chloride copolymer ("PVDC-VC"), as well as polyamide, polyester, polyalkylene carbonate, polyacrylonitrile, etc., as known to those of skill in the art.

Regardless of the structure of the multilayer film of the present invention, one or more conventional packaging film additives can be included therein. Examples of additives that can be incorporated include, but are not limited to, anti-blocking agents, antifogging agents, slip agents, colorants, flavorings, antimicrobial agents, meat preservatives, and the like. Where the multilayer film is to be processed at high speeds, inclusion of one or more antiblocking agents in and/or on one or both outer layers of the film structure can be provided. Examples of useful antiblocking agents for certain applications are corn starch and ceramic microspheres.

As is known to those of skill in the art, various polymer modifiers may be incorporated into certain film layers for the purpose of improving toughness and/or orientability or extensibility of the multilayer film. Modifiers which may be added to certain layers within the films of the present invention include: modifiers which improve low temperature toughness or impact strength, and modifiers which reduce modulus or stiffness. Exemplary modifiers include: styrene-butadiene, styrene-isoprene, and ethylene-propylene.

The heat-sealable films of the present invention can be produced using a hot blown process in which the film is extruded through an annular die and immediately hot blown by a forced air bubble, while the polymer is at or near its melt temperature. Such hot blown films exhibit a total (i.e., longitudinal plus transverse) free shrink at 185° F. of less than 10 percent, generally no more than 5 percent in either direction. Such hot blown films are not considered to be heat-shrinkable films because the amount of heat-shrinkability is not high enough to provide the advantageous shrink character typically required of heat-shrinkable films. Although hot blown films are oriented, the orientation occurs in the molten state, without producing the orientation-induced stress recognized in the art as that which renders the film heat-shrinkable.

On the other hand, films of the present invention can also be produced using a simple flat sheet or annular casting process. The film can be cast from a slot die with the extrudate being quenched (for example by immediately contacting a chilled roll) to cause solidification. Alternatively the cast extrudate may be cooled by cascading water or by casting directly into a cooled water bath.

On the other hand, films of the present invention can be produced using a sequential casting, quenching, reheating, and orientation process. The film can be cast from a slot die with the extrudate being quenched (for example by immediately contacting a chilled roll) to cause cooling and solidification, followed by being reheated to a temperature below the melt point (preferably to the softening point of the film), followed by solid-state orientation using a tenter frame. Alternatively, the film can be formed by downward casting from a flat sheet or annular die, with the resulting "tape" being quenched using cascading water, cooled air (or other gas), or even ambient air. The resulting solidified and cooled tape is then reheated to a desired orientation temperature and oriented while in the solid state, using for example, a trapped bubble. Films which are oriented in the solid state are considered to be heat-shrinkable, as they have a total free shrink (L+T) at 185° F. of greater than 10 percent.

Various homogeneous ethylene polymers were prepared using the process described below, and in accordance with, the process described in U.S. Pat. No. 5,866,663 to Brookhart et al.

Polymerizations are cationic in nature using co-catalysts such as methyl aluminoxane. In the Examples, the following convention is used for naming alpha-diimine complexes of metals, and the alpha-diimine itself. The alpha-diimine is indicated by the letters "DAB". To the left of the "DAB" are the two groups attached to the nitrogen atoms. To the right of the "DAB" are the groups on the two carbon atoms of the alpha-diimine group. To the right of all this appears the metal and ligands attached to the metal The synthesis of $(2,6-(i-Pr)_2Ph)_2DABMe_2$ was carried out as follows. 45.0 ml (0.239 mol) of 2,6-diisopropylaniline were added to a solution of 2,3-butanedione (10.0 ml, 0.114 mol) and formic acid (2.0 ml, 0.053 mol) in 100 ml methanol. A bright yellow solid formed rapidly. 100 Milliliters of methanol were added to the mixture after 4 hours to help dissolve the precipitate. After 24 hours stirring at room temperature, the precipitate was filtered from the solution and washed 3 times with chilled pentane. The yellow microcrystalline solid (32.39 g, 70% yield) was dried in vacuo for 3 hours. The synthesis of $[(2,6-Me_2Ph)_2DABMe_2]NiBr_2$ was carried out as follows. A solution of 0.753 g (2.57 mmol) of $(2,6-Me_2Ph)_2DABMe_2$ in tetrahydrofuran (20 ml) was added via cannula to a suspension of $NiBr_2(DME)$ (0.769 g, 2.49 mmol) in tetrahydrofuran (50 ml). An immediate reaction took place with the formation of a dark red solid in a dark red solution. After 24 hours stirring at room temperature the solid was recovered by filtration, washed with pentane (2×20 ml) and dried in vacuo (1.02 g, 80% yield). Ethylene was polymerized with Ni(II) α-diimine catalysts. The general procedure used in the polymerizations are set forth in the table below, which lists the catalyst, the polymerization conditions (i.e., temperature, pressure, amounts of catalyst and cocatalyst, reaction time, etc.) for each of the polymers described in the examples. Polymerizations were conducted in a jacketed 2-liter reactor (Autoclave Engineers') equipped with an overhead helical impeller. Pressure (+/−0.5 psig), temperature (+/−1° C.) and stirring (+/−20 rpm) were maintained by proportional/integral/derivative (PID) controllers. Data acquisition was recorded on a computer. Unless otherwise stated, the agitation rate was 400 rpm. In a typical polymerization experiment, 1 liter of dry deaerated toluene was transferred into the reactor. Ethylene was charged into the reactor and the system was allowed to equilibrate at the set temperature and pressure. 0.10 Milliliter of methyl aluminoxane (MAO) was injected into the reactor using a syringe to scavenge any residual trace of water. After 10 minutes the pressure was reduced below 12 psig and MAO was injected into the reactor followed by a solution of the catalyst (12 mg) in 6 ml of methylene chloride. After 30 minutes, the polymerization was terminated by venting the reactor and discharging the contents into a 4-liter Waring blender, containing 1 liter of chilled methanol. The discharged material was vigorously agitated and filtered through a Buchner funnel. The polymer was washed twice with acidified methanol and methanol and then dried in vacuo at 60° C.

TABLE 1

Properties of Polymers

| PE Polymer, total branch per 1000 C. | Catalyst | Temp (° C.) | Press. (psig) | Density (g/cm$^3$) | Melt Index (I$_2$) (g/10 min) | Tm (° C.) | M$_n$, (10$^3$) |
| --- | --- | --- | --- | --- | --- | --- | --- |
| PE 48 | [(2, 6-Me$_2$Ph)$_2$DABMe$_2$]NiBr$_2$ | 35 | 15 | 0.880 | 2.5 | 83.2 | 41.5 |
| PE 77 | [(2-(i-Pr),6-Me—Ph)$_2$DABMe$_2$]NiBr$_2$ | 45 | 25 | 0.870 | 1.4 | 39.5 | 66.5 |
| PE 79 | [(2-(i-Pr),6-Me—Ph)$_2$DABMe$_2$]NiBr$_2$ | 45 | 15 | 0.860 | 1.5 | 16.3 | 62.8 |
| PE 81 | [(2-(i-Pr),6-Me—Ph)$_2$DABMe$_2$]NiBr$_2$ | 45 | 15 | 0.858 | 1.3 | 14.3 | 55.0 |
| PE 93 | [(2-(i-Pr),6-Me—Ph)$_2$DABMe$_2$]NiBr$_2$ | 55 | 15 | — | 6.3 | 11.3 | 50.2 |

TABLE 1-continued

Properties of Polymers

| PE Polymer, total branch per 1000 C. | Catalyst | Temp (° C.) | Press. (psig) | Density (g/cm³) | Melt Index (I₂) (g/10 min) | Tm (° C.) | $M_n$, (10³) |
|---|---|---|---|---|---|---|---|
| PE 95 | [(2-(i-Pr),6-Me—Ph)₂DABMe₂]NiBr₂ | 55 | 15 | 0.855 | 7.0 | — | 52.2 |
| Engage 8100 (48) | (t-butyl amido) dimethyl (tetramethyl-n⁵-cyclopentadienyl) silane titanium dichloride | | | 0.870 | 1.0 | 56 | 79.8 |

Various monolayer films were prepared using the above-described SSH polyethylene polymers. Data regarding these films is provided in the examples below. The films were made by pressing polymer in a Tetrahedron press at 190° C. A pre-heating cycle at 1500 psi was followed by a pressing cycle at 12,000–20,000 psi, depending on the sample. Teflon® coated or Mylar® sheets were used to separate the sample from the pressing plates.

EXAMPLES 1–4 AND COMPARATIVE EXAMPLES 1–2

A series of five monolayer films were made to demonstrate the ability of SSH polymers to adhere to themselves at ambient conditions (i.e., room temperature) only by applying a moderate pressure. Each of the films contained a blend of (a) Dowlex 2044A, a linear low density ethylene/octene copolymer ("LLDPE #1") having a density of 0.916 g/cm³ and a melt flow index (I₂) of 3.3 g/10 min, obtained from the Dow Chemical Company of Midland, Mich., and (b) SSH ethylene homopolymer having 95 branches per 1000 carbon atoms (i.e., "PE95"), having a density of 0.855 g/cm³ and a melt flow index of 7 g/10 min. The five films were made identically except for the relative proportions of LLDPE #1 and PE95 present, with the amount of PE95 being varied from 10 weight percent (based on total film weight) to 50 weight percent. A sixth monolayer film, Comparative Example 2, was a film of 100 weight percent LLDPE #1. The films were 10×10 cm in size. Each of the six films was bonded using a Sentinel® heat sealer, by Sencorp Systems, set at 30° C., with a dwell time of 3 seconds. The bond strengths were measured using an Instron Mini 55 instrument.

As shown in FIG. 1, the pressure applied to the heat seal bar was varied from 30 to 100 psi. Comparative film 1, containing 100 weight percent LLDPE #1, did not adhere to itself even when the pressure applied was raised as high as 100 psi. The same result was obtained for Comparative film 2, containing 90 percent LLDPE #1 and 10 percent SSH PE95. However, the films of Examples 1 and 2, made from blends containing 20 percent and 30 percent PE95, respectively, adhered at 30° C. when subjected to an applied pressure of 100 psi. When the content of PE95 exceeded 30%, as with Examples 3 and 4 containing 40% and 50%, respectively, it was possible to obtain a bond strength of greater than 50 g/cm.

EXAMPLES 5 AND 6 AND COMPARATIVE EXAMPLES 3 AND 4

Four different monolayer films were produced for the purpose of studying adhesive bond strength. Comparative Example 3 was a mono-ply film made from 100 weight percent hyperbranched homogeneous PE48. Example 5, an example of the films useful in practicing the invention, was made from 100 weight percent SSH polyethylene having 77 branches per 1000 carbon atoms i.e., PE77. Example 6 was made from a blend of 50 weight percent LLDPE #1 and 50 weight percent SSH PE95. Comparative Example 4 film was made of 100 weight percent Engage® 8100 ethylene/octene copolymer having a density of 0.870 g/cm³ and a melt flow index (I₂) of 1.0 g/10 min. Engage® 8100 is a substantially linear homogeneous ethylene/octene copolymer supplied by DuPont Dow Elastomers having a degree of branching comparable to PE48 used in Comparative Example 3.

Figure 2:
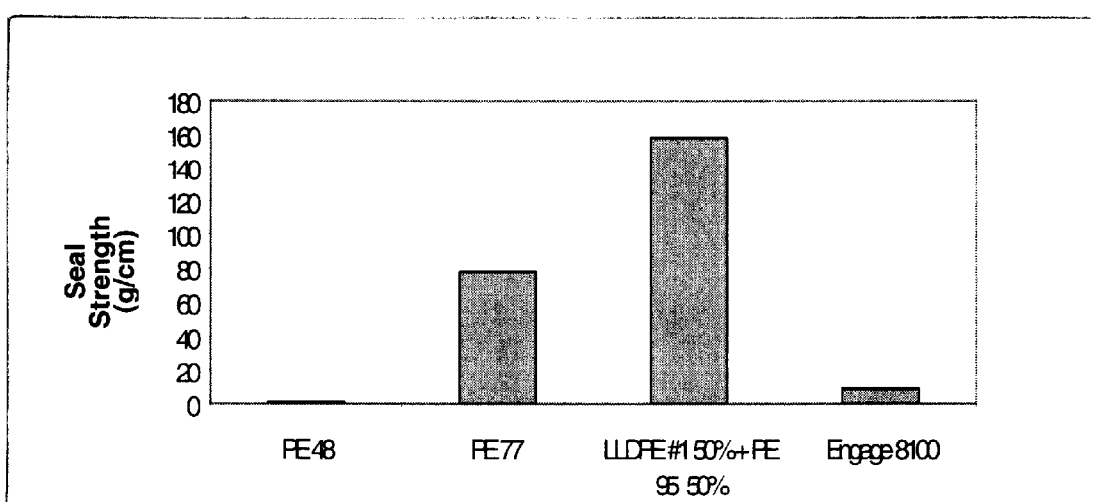

FIG. 2 sets forth the peel strength of the adhesive bond formed using the four films. Each of the bonds was made by pressing two pieces of the film together at 50 psi, for 3 seconds with the seal bar at only 30° C. The seal bar was the same as described in the earlier film tests. As shown in FIG. 2, when Comparative Example 3 films, made from 100 weight percent PE48, were pressed together, the force required to pull them apart was almost zero. Similarly, Comparative Example 4, consisting of Engage 8100, having about the same amount of branches per 1000 carbon atoms, formed unacceptable bonds using the same conditions. However, the force required to pull apart the adhesive bond of two pieces of the film of Example 5, 100 weight percent SSH PE77, was 78 g/cm. The force required to pull apart the bond of two pieces of film Example 6, made from a blend of 50 weight percent LLDPE #1 and 50 weight percent SSH PE95 was over 158 g/cm. This is surprising as the PE95 was present only at the level of 50 weight percent, and it can be seen from Comparative Example 1, that LLDPE #1 in the film does not contribute to the strength of the adhesive bond under the test conditions. Overall, the data in FIG. 2 demonstrates that adhesive bonding properties of the materials improved when incorporating SSH polyethylene, i.e., having greater than about 50 side chain per 11000 carbon atoms. It is interesting to compare the strength of the bond of Comparative Example 4, the film made with ENGAGE® 8100, with that of Example 5, PE 77. PE 77 and ENGAGE® 8100 have the same density (0.870 g/cm³) but at a contact pressure of 50 psi and at 30° C. the bond strength of the substantially spherical PE 77 (i.e., 79 g/cm) is almost 9 times a high as the corresponding bond strength of the substantially linear Engage 8100 (i.e., 9 g/cm). This difference in adhesive strengths between that of film made from a substantially linear, long chain branched homogeneous polyethylene (Comparative Example 4) and that of an inventive film (Example 5), comprising the SSH polyethylenes, demonstrates that the adhesive strength are determined more by polymer architecture than polymer density. Moreover, it may be observed that blends can achieve an adhesive strength above that of single polymers.

COMPARATIVE EXAMPLE 5

A monolayer film made from 100 weight percent hyperbranched homogeneous polyethylene having 48 branches per 1000 carbon atoms (i.e., PE 48) was tested for its ability to bond to itself at a low temperature, and for its ability to repeatedly form an adhesive bond to itself at a low temperature. Two pieces of this monolayer film were pressed together for 3 seconds at 35° C. and 40 psi (using the same bar sealer as in the previous examples) and then peeled opened using an INSTRON® Mini 55 instrument. The force required to pull the two films apart was zero. The films were repeatedly pressed together using the same time and temperature conditions but increasing the pressure up to 100 psi. Yet no measurable bond was observed. This result indicated that a requisite number of side chain branches (i.e., greater than 48) are necessary in the polymer chain to obtain a low temperature heat-sealable pressure-reclosable film, even for a film made from a hyperbranched homogeneous polyethylene.

EXAMPLES 7 AND 8

Figure 3:
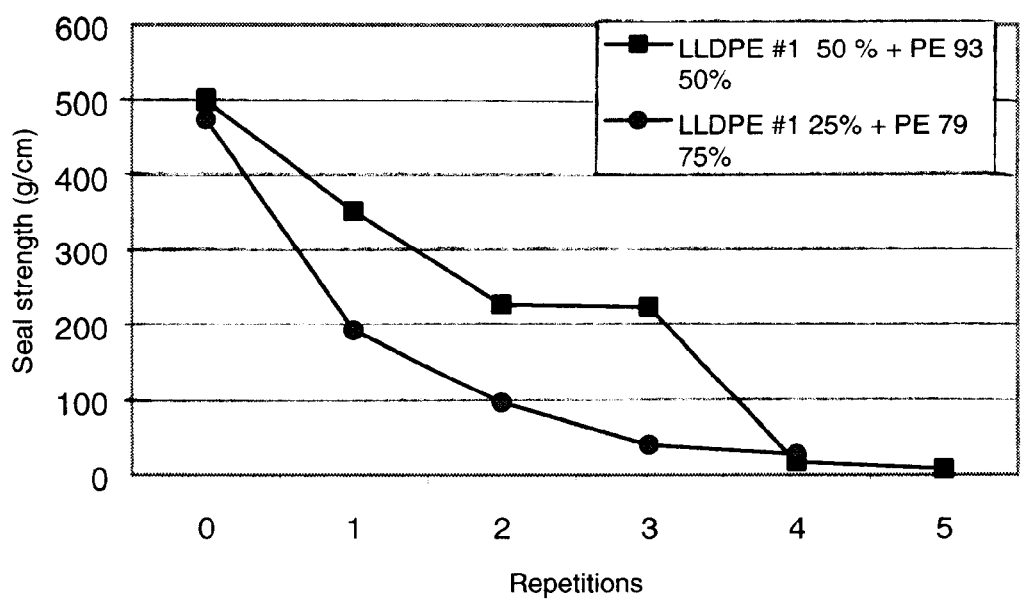

Two monolayer films were made, each containing a blend of LLDPE #1 (i.e., Dowlex 2044A, a linear low density ethylene/octene copolymer) and a SSH polyethylene. Example 7 was made from a blend of 50 weight percent LLDPE #1 and 50 weight percent PE 93, which was a SSH polyethylene having about 93 branches per 1000 carbon atoms. Example 8 was made from a blend of 25 weight percent LLDPE #1 and 75 weight percent PE 79, which was a SSH polyethylene having about 79 branches per 1000 carbon atoms. Two separate pieces of each of these films were heat sealed to themselves, using a the same heat seal bar as used in all earlier examples, at a seal bar temperature of 60° C. and at a pressure of 40 psi for 0.5 seconds. The resulting heat seal was then allowed to age for about 24 hours, after which the pieces of film were pulled apart, using the Instron® used in examples above. An adhesive bond was then formed in place of the heat seal, using the seal bar at 30° C. and 40 psi with a dwell time of 3 seconds. The force required to pull the resulting adhesive bond apart was then determined, and the process was repeated to provide data for five repetitions. The films were found to exhibit high initial heat seal strength, but the strength of the adhesive bonds decayed rapidly with successive low temperature open/seal cycles. FIG. 3, below, provides the data obtained in the above-described procedure.

FIG. 3 graphically illustrates the results for the films of Examples 7 and 8. The fact that the films of the example were sealed at only 60° C. is a consequence of the property of the substantially spherical polyethylenes to lower significantly the seal initiation temperature. Both films described in FIG. 3 had an initial heat seal strength of about 500 g/cm, and a pressure-reclose adhesive strength of about 200 g/cm. Despite the fact that subsequent closures were conducted as low temperature heat seals (i.e., at 30° C.), it is believed that Examples 7 and 8 exhibit controlled pressure reclosability. It is interesting to note the greater adhesive strength of the composition having equal amounts of LLDPE and SSH.

Many packaging applications require only a few open and reclose cycles before the product is completely used. While not wishing to be limited to any particular theory or mode of operation, it is felt that at least one reason for blends of SSH polyethylene showing an improved result when blended into another polyolefin, such as into LLDPE, over either component separately, is that the SSH polyethylene may migrate or "bloom" to the surface and enrich the surface above the bulk level. This improvement in surface activity is believed to be especially effective when the SSHPE is added to another polyolefin having a crystallinity level greater than 25%, preferably greater than 35%, more preferably greater than 45%, more preferably greater than 60%.

Figure 4:
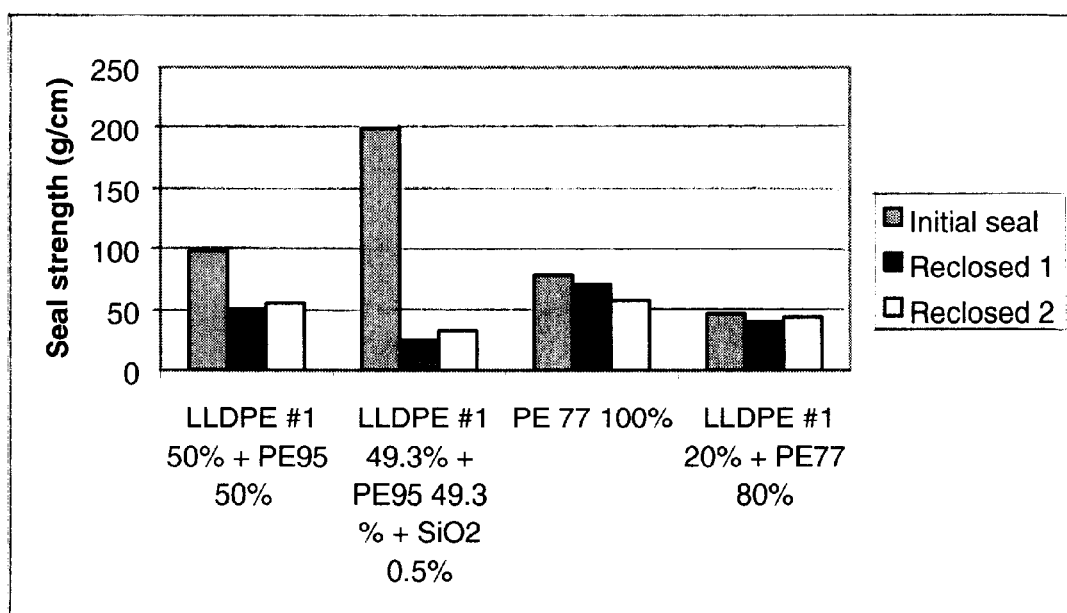

Further evidence of the properties of films comprising SSH polyethylene is provided in FIG. 4. The results presented in FIG. 4 provide data for the initial adhesive bond strength, as well as the bond strengths for a first reclosing and a second reclosing. The initial adhesive bond was made with the heat seal bar set at only 30° C., 60 psi and 3 seconds dwell time. The subsequent reclosing steps were performed by manually pressing on the films without heating. Films comprising blends of the SSH polyethylene with LLDPE provided strong heat seals and pressure reclosable seal layers useful in fabricating multilayer packaging films.

All subranges of all disclosed ranges are hereby expressly disclosed. All references herein to ASTM procedures are hereby incorporated, in their entireties, by reference thereto. Although the present invention has been described in conjunction with certain preferred embodiments, it is to be understood that modifications and variations may be utilized without departing from the principles and scope of the invention, as those skilled in the art will readily understand. Accordingly, such modifications may be practiced within the scope of the following claims.

What is claimed is:

1. A multilayer film comprising a hermetically heat-sealable, pressure-reclosable, outer heat seal layer comprising a blend of a substantially spherical homogeneous polyolefin with a different thermoplastic polymer, the substantially spherical polyolefin being present in an amount of from about 20 to 80 weight percent, based on total layer weight, the different thermoplastic polymer being present in the layer in an amount of from about 80 to 20 weight percent, based on total layer weight, the substantially spherical polyolefin having at least 60 side chain branches per 1000 carbon atoms, and which contains for every 100 branches that are methyl, 1 to about 80 ethyl branches, 1 to about 20 propyl branches, 1 to about 50 butyl branches, 1 to about 20 amyl branches, and 1 to about 100 hexyl or longer branches, the substantially spherical homogeneous polyolefin having a melt index of from about 1 to 10.

2. The film according to claim 1, wherein the substantially spherical homogeneous polyolefin has from about 65 to about 140 branches per 1000 methylene groups, and which contains for every 100 branches that are methyl, about 1 to about 20 ethyl branches, 1 to about 10 propyl branches, 1 to about 15 butyl branches, 1 to about 10 amyl branches, and 1 to about 35 hexyl or longer branches.

3. The film according to claim 1, wherein the substantially spherical homogeneous polyolefin has from about 80 to about 125 branches per 1000 methylene groups, and which contains for every 100 branches that are methyl, about 2 to about 18 ethyl branches, about 2 to about 8 propyl branches, about 2 to about 12 butyl branches, about 2 to about 8 amyl branches, and about 8 to about 30 hexyl or longer branches.

4. The film according to claim 3, wherein the substantially spherical homogeneous polyolefin has from about 85 to about 120 branches per 1000 methylene groups.

5. The film according to claim 3, wherein the substantially spherical homogeneous polyolefin has from about 75 to about 85 branches per 1000 methylene groups.

6. The film according to claim 1, wherein the substantially spherical homogeneous polyolefin has a density of from about 0.85 to 0.88 g/cm$^3$.

7. The film according to claim 1, wherein the substantially spherical homogeneous polyolefin is a homopolymer derived from ethylene.

8. The film according to claim 7, wherein the substantially spherical homogeneous polyolefin is a copolymer comprising mer units derived from ethylene and one or more members selected from the group consisting of propylene, butene, hexene, and octene.

9. The film according to claim 1, wherein the film is capable of exhibiting a strength of a 40 psi pressure-induced bond of at least 100 grams per centimeter for at least 2 repetitions.

10. The film according to claim 1, wherein the multilayer film is produced using a coextrusion process.

11. The film according to claim 1, wherein the film is produced using a lamination process.

12. The multilayer film according to claim 1, wherein the multilayer film further comprises an oxygen barrier layer.

13. The film according to claim 1, wherein the substantially spherical homogeneous polyolefin has at least 70 branches per 1000 carbon atoms.

14. The film according to claim 1, wherein the different polymer comprises at least one member selected from the group consisting of polyolefin homopolymer, ethylene/alpha-olefin copolymer, polyamide, polyester, ethylene/vinyl alcohol copolymer, halogenated polymer, polystyrene, polynorbornene, ethylene/ester copolymer, and ethylene/unsaturated acid polymer.

15. The film according to claim 1, wherein the substantially spherical homogeneous polyolefin is present in the outer layer in an amount of at least 30 to 70 weight percent.

16. The film according to claim 1, wherein the film is heat-shrinkable.

17. The film according to claim 1, wherein the film has a thickness of from about 0.3 to 25 mils.

18. A process for making a multilayer film, comprising:
(A) coextruding a first layer and a second layer, wherein the first layer is an outer layer containing a substantially spherical homogeneous polyolefin having at least 60 branches per 1000 methylene groups, and which contains for every 100 branches that are methyl, 1 to about 80 ethyl branches, 1 to about 20 propyl branches, 1 to about 50 butyl branches, 1 to about 20 amyl branches, and 1 to about 100 hexyl or longer branches, wherein the outer layer is hermetically heat-sealable, and pressure-reclosable, and the second layer is directly adhered to the first layer; and
(B) orienting the extrudate so that an oriented film is formed.

19. A roll of film comprising a disposable outer layer which is directly and peelably adhered to a first surface of second layer comprising a substantially spherical homogeneous polyolefin having at least 60 branches per 1000 methylene groups, and which contains for every 100 branches that are methyl, 1 to about 80 ethyl branches, 1 to about 20 propyl branches, 1 to about 50 butyl branches, 1 to about 20 amyl branches, and 1 to about 100 hexyl or longer branches, wherein the second layer is hermetically heat-sealable, and pressure-reclosable, and a second surface of the second layer is directly adhered to a thermoplastic third layer.

20. A packaging article comprising an inside layer comprising a substantially spherical homogeneous polyolefin having at least 60 branches per 1000 methylene groups and which has for every 100 branches that are methyl, 0 to about 80 ethyl branches, 1 to about 20 propyl branches, 1 to about 50 butyl branches, 1 to about 20 amyl branches, and 1 to about 100 hexyl or longer branches, with the inside layer heat sealed to itself or another component of the article, and the inside layer being hermetically heat-sealable and pressure-reclosable to itself or the other component.

21. The packaging article according to claim 20, wherein the packaging article is a bag and the inside layer is hermetically heat sealed to itself.

22. The packaging article according to claim 20, wherein the multilayer film is heat sealed to a second component which is molded or thermoformed.

23. A process for making a sealed article, comprising:
(A) providing a film having a seal layer comprising substantially spherical homogeneous polyolefin having at least 60 branches per 1000 methylene groups, and which contains for every 100 branches that are methyl, 1 to about 80 ethyl branches, 1 to about 20 propyl branches, 1 to about 50 butyl branches, 1 to about 20 amyl branches, and 1 to about 100 hexyl or longer branches;
(B) heat sealing the film to itself or another article by heating the seal layer to a temperature of at least 50° C.

24. A hermetically heat sealable, pressure reclosable multilayer film comprising:
(A) a sealant layer comprising, at least 30% by weight of a single site catalyzed substantially spherical polyolefin, the substantially spherical polyolefin having a density of from about 0.85 to 0.89 g/cc, a melt index of 0.5 to 8 g/10 min, a Mw/Mn less than 3, and a short chain branching level of about 60 to 100 methyl groups per 1,000 carbon atoms; and,
(B) an outer heat resistant layer comprising a thermoplastic polyolefin having DSC melting point or glass transition of at least about 100° C., the outer layer having a coefficient of friction of less than 0.5 as measured by ASTM D 1894.

25. The multilayer film according to claim 24, wherein the sealant layer comprises a substantially spherical polyolefin having a melt index of 1.5 to 7.

26. The multilayer film according to claim 24, wherein the sealant layer comprises a substantially spherical polyolefin having a weight average molecular weight (Mw) of from 90,000 to 150,000.

* * * * *